United States Patent
Hui et al.

(10) Patent No.: US 8,675,718 B2
(45) Date of Patent: Mar. 18, 2014

(54) ITERATIVE PRECODER MATRIX COMPUTATION METHOD AND APPARATUS

(75) Inventors: Dennis Hui, Cary, NC (US); Kambiz Zangi, Chapel Hill, NC (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1203 days.

(21) Appl. No.: 12/571,494

(22) Filed: Oct. 1, 2009

(65) Prior Publication Data

US 2011/0080961 A1    Apr. 7, 2011

(51) Int. Cl.
  *H04B 1/38*   (2006.01)
  *H04L 27/00*  (2006.01)
  *H04L 7/00*   (2006.01)

(52) U.S. Cl.
  USPC ........... 375/220; 375/219; 375/316; 375/295; 375/358

(58) Field of Classification Search
  USPC ............... 375/219, 222, 220, 240.02–240.07, 375/240.1, 240.11, 240.18, 240.22, 240.23, 375/240.24, 240.26–240.28, 265, 270, 295, 375/296, 299, 316, 345, 344, 347, 348, 277, 375/278, 284, 285, 324, 340, 341, 346, 350, 375/358
  See application file for complete search history.

(56) References Cited

U.S. PATENT DOCUMENTS

2010/0183088 A1* 7/2010 Inanoglu .................. 375/267
2011/0249629 A1* 10/2011 Ko et al. .................. 370/329

OTHER PUBLICATIONS

Ku et al.: "Tx-Rx Beamforming with Multiuser MIMO Channels in Multiple-cell Systems", IEEE 10th International Conference on Advanced Communication Technology—ICACT 2008, Feb. 17, 2008, pp. 1767-1771, XP031245451, NJ, USA, ISBN: 978-89-5519-136-3.
Karakayali M.K. et al., "Network coordination for spectrally efficient communications in cellular systems," IEEE Wireless Communications, val. 13, pp. 56-61, Aug. 2006.
Mezghani A. "Transceiver Design for Multi-User MIMO Systems," Proc. IEEE Workshop on Smart Antennas, Ulm, Germany, Mar. 2006, the whole document.
Joham M. "Linear Transmit Processing in MIMO Communications Systems," IEEE Trans. Sig. Proc., val. 53, No. 8, pp. 2700-2712, Aug. 2005.

* cited by examiner

*Primary Examiner* — Sam K Ahn
*Assistant Examiner* — Linda Wong (57) ABSTRACT

Precoder weights employed at a base station which coordinates with other base stations to form a super-cell are determined by: (a) determining an initial downlink precoding matrix at the base station for a mobile station serviced by the base station in the super-cell; (b) revising a downlink receiver matrix associated with the mobile station based on the initial downlink precoding matrix; (c) transforming the downlink receiver matrix to an uplink precoder matrix associated with the mobile station; (d) revising an uplink receiver matrix associated with each base station in uplink communication with the mobile station based on the uplink precoder matrix associated with the mobile station; and (e) revising the initial downlink precoding matrix by transforming the uplink receiver matrix to a revised downlink precoding matrix. Steps (b), (c), (d) and (e) are repeated for a particular number of iterations to determine a final downlink precoding matrix for the mobile station.

14 Claims, 3 Drawing Sheets

ITERATIVE PRECODER MATRIX COMPUTATION METHOD AND APPARATUS

TECHNICAL FIELD

The present invention generally relates to precoder matrix computation, and more particularly relates to precoder matrix computation in a coordinated multi-point transmission system.

BACKGROUND

The spectral efficiency of communication networks can be improved by aggressively reusing scarce radio resources in neighboring cells. As a result, inter-cell interference has become a main source of signal disturbance, limiting not only the service quality of the cell-edge users but also the overall system throughput. Coordinated multi-point (CoMP) transmission and/or reception is becoming more widely adopted due to its promise in effectively mitigating inter-cell interference. The basic idea behind CoMP in downlink is to connect multiple base stations from several adjacent cells to form a "super-cell", or a so-called CoMP cell, such that transmissions to multiple mobile stations within each CoMP cell can be coordinated to reduce or even avoid mutual interference among the mobile stations.

Zero-forcing (ZF) linear precoding has been employed for combating inter-cell interference in a CoMP downlink. ZF linear precoding allows simultaneous transmission over the same frequency band to multiple users without creating any mutual interference within a CoMP cell by sending the signal of each user in a direction that is orthogonal to the channels of other users. Although ZF precoding has low computational complexity and performs well when the network has low load, at high load, however, the transmitter can run out of orthogonal dimensions, causing most of the users to transmit and/or receive at unfavorable directions which in turn leads to low signal-to-noise-plus-interference-ratio and thus limits the overall system throughput.

MMSE (minimum mean-squared error) linear multi-user precoding has been proposed as an alternative to ZF precoding. In principle, an MMSE precoder can advantageously weight down the importance of those users with weak channel responses and thus open-up the available signal dimension at high load. However, unlike their receiver counterpart, multi-user MMSE precoders do not have closed-form expressions in general. Mainly, the choice of precoders that minimizes the MSE (mean-squared error) depends on the choice of the corresponding receiver, and vice versa, leading to a set of optimality conditions that are no longer linear as in the case of MMSE receivers.

Since multi-user MMSE precoders do not have closed-form expressions, most of the algorithms available for computing precoding weights are based on numerical optimization routines which typically require proper choices of some associated numerical parameters to guarantee convergence. Moreover, most MMSE precoding techniques assume the mobile stations have only one receive antenna. However, in next-generation cellular communication systems, most mobile stations will likely have more than one receive antenna. In addition, most MMSE precoding techniques assume that the channel response between each mobile station UE and each base station is known perfectly at the transmitter. This assumption is unrealistic in practice due to the feedback delay and/or the limited amount of pilot sequence information available in typical cellular systems.

SUMMARY

An iterative precoder computation algorithm can be applied to more than one receive antenna of a mobile station. Although the preceding method is iterative in nature, the method does not require the use of any generic numerical optimization routines and setting of the associated parameters. The precoding computation method ensures monotonical convergence with reducing (weighted) mean-squared errors after each iteration. In addition, the method can be modified to account for channel estimation error so that the computed precoding matrices are more robust with regard to channel uncertainty.

The iterative precoder computation method exploits two aspects of MMSE precoding. First, for any given channel response, there exists MSE-preserving transformations between precoding matrices in the original, or so called primal, downlink problem and the receiver matrices in a corresponding dual uplink problem, and vice versa. Second, for either the downlink primal problem or the uplink dual problem, the receiver matrices can be readily computed for any given set of precoding matrices. According to one embodiment, optimal receiver matrices are iteratively computed in the primal downlink (or the dual uplink problem) and transformed into precoding matrices in the dual uplink (or, respectively, the primal downlink problem). Since the optimal receiver matrices can only reduce the overall MSE and since the uplink-downlink transformations preserve the MSE, the method converges in the sense of monotonically decreasing MSE. In addition, channel estimation error can be modeled as an ergodic Gaussian-distributed random variable with known covariance, and channel uncertainty can be further compensated for during the computation of the precoding matrices with little increase in complexity.

According to an embodiment, precoder weights employed at a base station which coordinates with other base stations to form a super-cell are determined by: (a) determining an initial downlink precoding matrix at the base station for a mobile station serviced by the base station in the super-cell; (b) revising a downlink receiver matrix associated with the mobile station based on the initial downlink precoding matrix; (c) transforming the downlink receiver matrix to an uplink precoder matrix associated with the mobile station; (d) revising an uplink receiver matrix associated with each base station in uplink communication with the mobile station based on the uplink precoder matrix associated with the mobile station; and (e) revising the initial downlink precoding matrix by transforming the uplink receiver matrix to a revised downlink precoding matrix. Steps (b), (c), (d) and (e) are repeated for a particular number of iterations to determine a final downlink precoding matrix for the mobile station.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
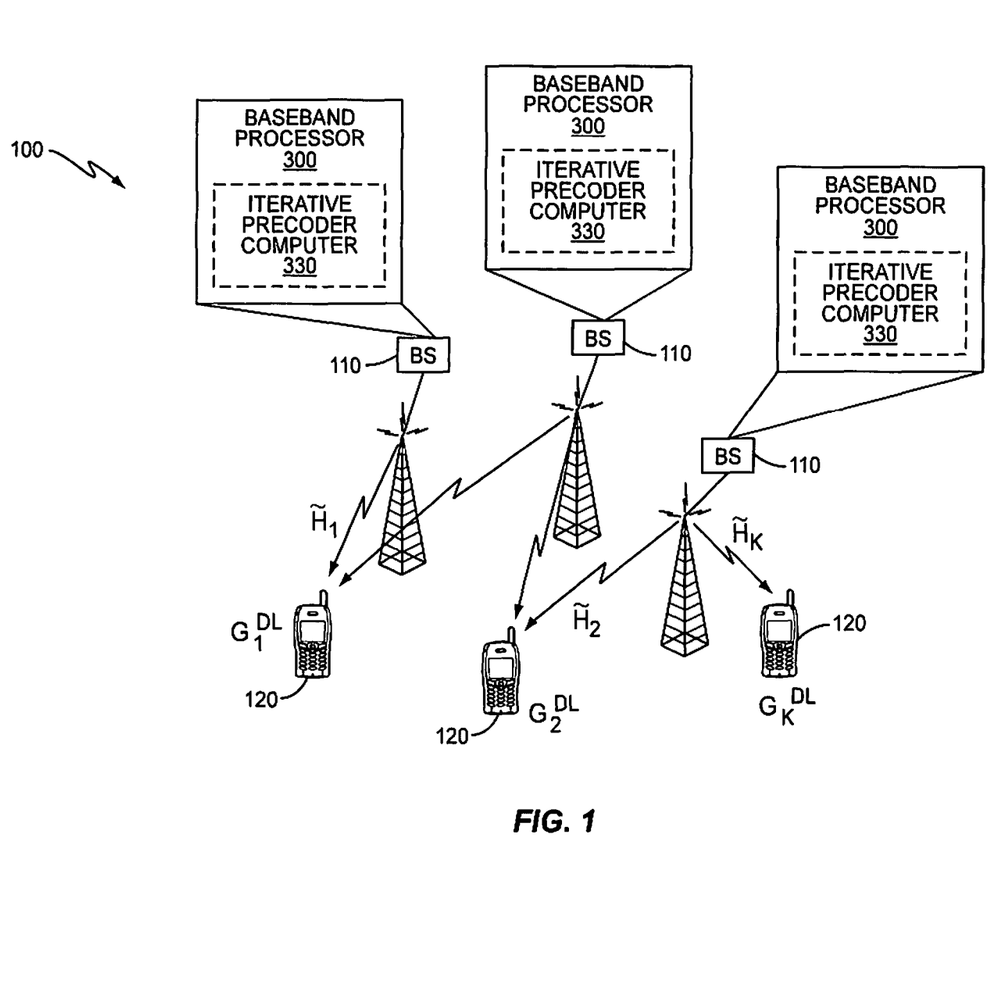
FIGS. 1 and 2 illustrate block diagrams of an embodiment of a coordinated multi-point system which employs an iterative precoding computation method.

FIG. 1 illustrates an embodiment of a CoMP transmission network 100 where $n_b$ base stations 110 transmit in the downlink direction to k mobile stations 120 simultaneously on the same frequency and time. The base stations 110 coordinate with one another to form a super-cell, also referred to herein as a CoMP cell. For each mobile station $k \in \{1, 2, \ldots, K\}$ serviced in the CoMP cell, let $\tilde{H}_k$ be the $n_{r,k}$ by $n_t*n_b$ channel response matrix for mobile station k, where $n_{r,k}$ denotes the number of receive antennas at mobile station k, $n_b$ denotes the number of cooperating base stations 110, and $n_t$ denotes the number of transmit antenna in each base station 110. Also let $P_k$ denote a $n_t*n_b$-by-$n_{s,k}$ precoding matrix (or matrix of precoding weights) for mobile station k, where $n_{s,k}$ denotes the number of data streams transmitted to mobile station k, and let $G_k$ denote the $n_{s,k}$-by-$n_{r,k}$ receiver matrix used by mobile station k to combine the signals from its receive antennas into $n_{s,k}$ signal streams for subsequent demodulation. For notational simplicity, $P=[P_1, P_2, \ldots, P_K]$ and $G=\mathrm{diag}\{G_1, G_2, \ldots, G_K\}$.

Symbols transmitted from the base stations 110 to mobile station k can be denoted in vector form. Let $s_k$ denote a $n_{s,k}$-by-1 symbol vector transmitted from the base stations 110 to mobile station k, normalized such that $Es_k s_k^H = 1$. The signal received at mobile station k is given by $$r_k = \tilde{H}_k \left( \sum_{j=1}^{K} P_j s_j \right) + \tilde{n}_k.$$

An estimate $\hat{s}_k$ of the symbol vector $s_k$ can be constructed based on $r_k$, where $\tilde{n}_k$ denotes the noise-plus-other-CoMP-cell-interference observed by mobile station k with covariance matrix $R_k = E\tilde{n}_k \tilde{n}_k^H$, $R_k^{-1/2}$ denoting the inverse of a square root of $R_k$ such that $(R_k^{-1/2})^H R_k^{-1/2} = R_k^{-1}$. The quality of the communication link between the cooperating base stations 110 and mobile station k can be measured by the MSE (mean-squared error) between $s_k$ and its estimate $\hat{s}_k$ constructed at mobile station k as given by:

$$mse_k^{DL}(P, G_k) \equiv E\|s_k - \hat{s}_k\|^2 \quad (1)$$

where $$\begin{aligned}
\hat{s}_k &= G_k R_k^{-1/2} r_k \\
&= G_k R_k^{-1/2} \left[ \tilde{H}_k \left( \sum_{j=1}^{K} P_j s_j \right) + \tilde{n}_k \right] \\
&= G_k H_k \left( \sum_{j=1}^{K} P_j s_j \right) + G_k n_k \\
&= G_k H_k P s + G_k n_k
\end{aligned} \quad (2)$$

is the $n_{s,k}$-by-1 estimated symbol vector after combining signals from all receive antennas using receiver matrix $G_k$, $s = [s_1^H, s_2^H, \ldots, s_K^H]^H$, $n_k = R_k^{-1/2} \tilde{n}_k$ is the whitened or de-correlated noise with identity covariance matrix $En_k n_k^H = I_{n_{r,k}}$ and $H_k = R_k^{-1/2} \tilde{H}_k$ is the whitened channel response matrix for mobile station k.

The iterative precoder computation method described herein finds the best set of precoding matrices P that, when combining with the corresponding best set of receiver matrices G, yields the minimum weighted-sum-MSE under a total power constraint over all transmit antennas. More precisely, the iterative precoder computation method seeks to compute:

$$P_{MMSE} \equiv \operatorname*{argmin}_{P: tr(PP^H) \leq P_{max}} \min_{G} \sum_{k=1}^{K} w_k mse_k(P, G_k) \quad (3)$$

$$= \operatorname*{argmin}_{P: tr(PP^H) \leq P_{max}} \sum_{k=1}^{K} w_k \min_{G_k} \{mse_k(P, G_k)\},$$

where $P_{max}$ denotes the maximum total power to be transmitted from all antennas, and $\{w_k\}$ denotes a set of per-user scalar weight factors chosen beforehand, possibly based on the average MSE or average data rate of each user to achieve certain fairness criteria among different users. For the special case of $w_k = 1$ for all k mobile stations 120, the weighted MSE reduces to the ordinary sum MSE. The MSE of each user can be expressed by substituting equation (2) into equation (1) as given by:

$$mse_k^{DL}(P, G_k) = tr\{I - G_k H_k P_k - P_k^H H_k^H G_k^H + G_k(H_k P P^H H_k^H + I) G_k^H\} \quad (4)$$

For a given set of precoding matrices P, the optimal receiver matrix for each mobile station 120 is the one that minimizes each individual user's MSE as indicated by equation (4). Thus, the optimal receiver matrix is the well-known linear MMSE receiver matrix that treats signals transmitted to other users as interference as given by:

$$\begin{aligned}
G_k &= P_k^H H_k^H [H_k P P^H H_k^H + I]^{-1} \\
&= P_k^H H_k^H \left[ H_k \left( \sum_{j=1}^{K} P_j P_j^H \right) H_k^H + I \right]^{-1}
\end{aligned} \quad (5)$$

Substituting equations (4) and (5) into equation (3), yields:

$$\begin{aligned}
P_{MMSE} &= \operatorname*{argmin}_{P: tr(PP^H) \leq P_{max}} \sum_{k=1}^{K} w_k tr \left[ I - P_k^H H_k^H \left[ H_k \left( \sum_{j=1}^{K} P_j P_j^H \right) H_k^H + I \right]^{-1} H_k P_k \right] \\
&= \operatorname*{argmax}_{P: tr(PP^H) \leq P_{max}} \sum_{k=1}^{K} w_k tr \left[ P_k^H H_k^H [H_k P P^H H_k^H + I]^{-1} H_k P_k \right].
\end{aligned} \quad (6)$$

The optimization problem in equation (6) is in general difficult to solve and does not have a closed-form expression.

The precoder computation method described herein solves the optimization problem in equation (6) by iteratively transforming the downlink optimization problem into a virtual uplink dual problem and back to the original downlink (primal) problem. For clarity in the following description, the superscript "DL" is attached to parameters when referring to downlink precoders P and receiver matrices G to distinguish them from those in the uplink dual problem.

Figure 2:
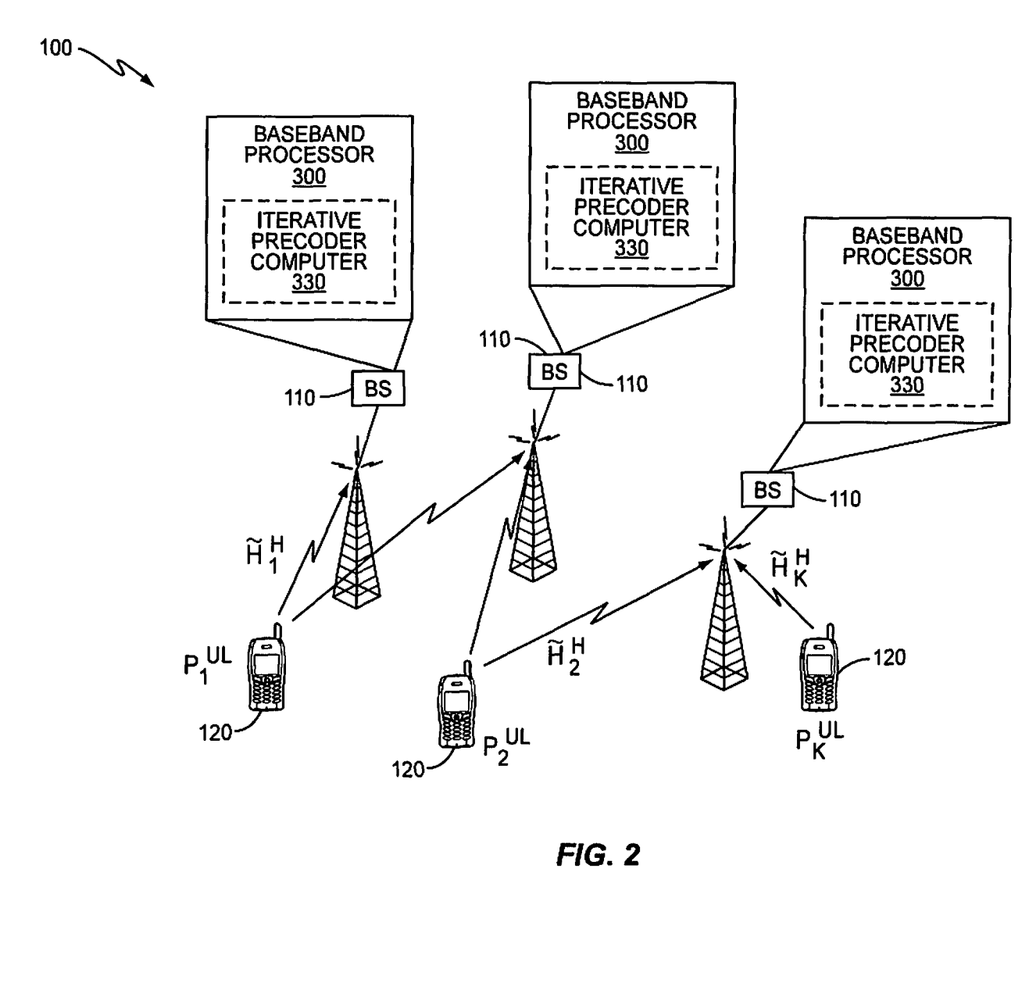

FIG. 2 illustrates the CoMP transmission network of FIG. 1, but for the uplink communication direction. In the uplink multi-access transmission scenario depicted in FIG. 2, the k mobile stations 120 are transmitting in the uplink direction to the $n_b$ base stations 110 simultaneously on the same frequency and time. For this uplink dual channel, the channel response matrix for mobile station k is $H_k^H$, the Hermitian transpose of the corresponding channel in the primal downlink problem. Let $P_k^{UL}$ denote a $n_{r,k}$-by-$n_{s,k}$ precoding matrix (or matrix of precoding weights) for mobile station k, where $n_{s,k}$ denotes the number of data streams transmitted from mobile station k in the uplink direction. Let $G_k^{UL}$ denote the $n_{s,k}$-by-$n_t*n_b$ receiver matrix used by the base stations 110 to combine the received signal from all $n_t*n_b$ receive antennas into $n_{s,k}$ signal streams for subsequent demodulation at the base stations 110. Similar to the downlink, for notational simplicity, $G^{UL}=[G_1^{UL,H}, G_2^{UL,H}, \ldots, G_K^{UL,H}]^H$ and $P^{UL}=\text{diag}\{P_1^{UL}, P_2^{UL}, \ldots, P_K^{UL}\}$.

Symbols transmitted from mobile station k to the base stations 110 can be denoted in vector form. Let $s_k^{UL}$ denote a $n_{s,k}$-by-1 symbol vector transmitted from mobile station k to the base stations 110 normalized such that $Es_k^{UL}s_k^{UL,H}=1$. The signal received by all base stations 110 is given by $$r^{UL} = \sum_{k=1}^{K} H_k^H P_k^{UL} s_k^{UL} + \tilde{n}^{UL},$$

based on which an estimate $\hat{s}_k^{UL}$ of $s_k^{UL}$ is constructed, where $n^{UL}$ denotes the noise-plus-other-CoMP-cell-interference observed by the base stations 110 with covariance matrix $En^{UL}n^{UL,H}=I$. The quality of the communication link between the cooperating base stations 110 and mobile station k is measured by the MSE between $s_k^{UL}$ and its estimate $\hat{s}_k^{UL}$ constructed at mobile station k as given by:

$$mse_k^{UL}(P^{UL}, G_k^{UL}) \equiv E\|s_k^{UL} - \hat{s}_k^{UL}\|^2 \quad (7)$$

where $$\hat{s}_k^{UL} = G_k^{UL}\left[\left(\sum_{j=1}^{K} H_j^H P_j^{UL} s_j^{UL}\right) + n^{UL}\right] \quad (8)$$

$$= G_k^{UL} H^H P^{UL} s^{UL} + G_k^{UL} n^{UL}$$

is the $n_{s,k}$-by-1 estimated symbol vector after combining signals transmitted from all mobile station receive antennas using receiver matrix $G_k^{UL}$ and $s^{UL}=[s_1^{UL,H}, s_2^{UL,H}, \ldots, s_K^{UL,H}]^H$. Substituting equation (8) into equation (7), yields an MSE expression for each user as given by:

$$mse_k^{UL}(P^{UL},G_k^{UL})=\text{tr}\{I-G_k^{UL}H_k^H P_k^{UL}-P_k^{UL,H}H_k^H G_k^{UL,H}+G_k^{UL}(H^H P^{UL} P^{UL,H} H+I)G_k^{UL,H}\} \quad (9)$$

For a given set of precoding matrices $P^{UL}$ employed at mobile station k, equation (9) indicates that the optimal receiver matrix for each mobile station 120 is the well-known linear MMSE receiver matrix that treats signals transmitted from other users as interference as given by:

$$G_k^{UL} = P_k^{UL,H} H_k [H^H P^{UL,H} H + I]^{-1} \quad (10)$$

$$= P_k^{UL,H} H_k \left[\sum_{j=1}^{K} H_j^H P_j^{UL,H} H_j + I\right]^{-1}.$$

The motivation for considering the dual uplink problem lies in the close relationship between the precoding matrix in the downlink and the receiver matrix in the dual uplink. Particularly, for each set of precoding matrices and receiver matrices $(P^{DL},G^{DL})$ in the downlink primal problem, there exist a corresponding set of precoding matrices and receiver matrices $(P^{UL},G^{UL})$ in the dual uplink problem such that:

$$mse_k^{UL}(P^{UL},G_k^{UL})=mse_k^{DL}(P^{DL},G_k^{DL}) \quad (11)$$

for all k mobile stations 120 serviced in the CoMP cell. Moreover, the corresponding precoding matrices $P^{DL}$ employed at the base stations 110 in the downlink (or $P^{UL}$ in the uplink) are related to the corresponding receiver matrices $G^{UL}$ employed at the base stations 110 in the uplink (or, respectively, $G^{DL}$ in the downlink) that yield the same mean-squared error by a set of simple per-user scalar transformation factors, e.g. as given by:

$$P_k^{DL}=\alpha_k G_k^{UL,H} \text{ and } P_k^{UL}=\alpha_k G_k^{DL,H} \quad (12)$$

Hence, for a given precoder-receiver pair $(P^{DL},G^{DL})$ in the downlink, the corresponding per-user transformation factors $\{\bar{\alpha}_k\}_{k=1}^K$ can be obtained by eliminating the variables $P^{UL}$ and $G^{UL}$ in equation (11) using equation (12) and by replacing $\{\alpha_k\}_{k=1}^K$ with $\{\bar{\alpha}_k\}_{k=1}^K$. This yields a set of linear equations of $\{\bar{\alpha}_k\}_{k=1}^K$ in terms of $(P^{DL},G^{DL})$ given by:

$$T\begin{bmatrix}\bar{\alpha}_1^2 \\ \bar{\alpha}_2^2 \\ \vdots \\ \bar{\alpha}_K^2\end{bmatrix} = \begin{bmatrix}tr\{P_1^{DL}P_1^{DL,H}\} \\ tr\{P_2^{DL}P_2^{DL,H}\} \\ \vdots \\ tr\{P_K^{DL}P_K^{DL,H}\}\end{bmatrix}, \quad (13)$$

where $$[T]_{i,j} = \begin{cases} tr\left\{\sum_{l\neq i} G_i^{DL} H_l P_l^{DL,H} H_l^H G_i^{DL,H} + G_i^{DL} G_i^{DL,H}\right\} & \text{for } j=i \\ -tr\{G_j^{DL} H_j P_i^{DL} P_i^{DL,H} H_j^H G_j^{DL,H}\} & \text{for } j\neq i. \end{cases}$$

Since T is a strictly diagonally dominant real-valued matrix with positive diagonal entries and negative off-diagonal entries, T is invertible, and all entries of $T^{-1}$ are non-negative. Thus, the solution vector $[\bar{\alpha}_1^2, \bar{\alpha}_2^2, \ldots, \bar{\alpha}_K^2]$ of equation (13) has positive entries. The resulting scaling factors $\{\bar{\alpha}_k\}_{k=1}^K$ can then be used to transform $(P^{DL},G^{DL})$ to the corresponding $(P^{UL},G^{UL})$ while preserving the mean-squared error of each user. Moreover, summing up the rows of equation (13) and combining with equation (12), yields:

$$\sum_{k=1}^{K} tr\{P_k^{DL}P_k^{DL,H}\} = \sum_{k=1}^{K} \bar{\alpha}_k^2 tr\{G_k^{DL}G_k^{DL,H}\} = \sum_{k=1}^{K} tr\{P_k^{UL}P_k^{UL,H}\} \quad (14)$$

That is, the transformation also preserves the total transmit power.

Similarly, for a given precoder-receiver pair $(P^{UL},G^{UL})$ in the dual uplink, the corresponding per-user transformation factors $\{\tilde{\alpha}_k\}_{k=1}^{K}$ from dual uplink to downlink can be obtained by eliminating the variables $P^{DL}$ and $G_k^{DL}$ in equation (11) using equation (12) and by replacing $\{\alpha_k\}_{k=1}^{K}$ with $\{\tilde{\alpha}_k\}_{k=1}^{K}$. Doing so yields a set of linear equations of $\{\tilde{\alpha}_k\}_{k=1}^{K}$ in terms of $(P^{UL}, G^{UL})$ as given by:

$$\bar{T}\begin{bmatrix} \bar{\alpha}_1^2 \\ \bar{\alpha}_2^2 \\ \vdots \\ \bar{\alpha}_K^2 \end{bmatrix} = \begin{bmatrix} tr\{P_1^{UL} P_1^{UL,H}\} \\ tr\{P_2^{UL} P_2^{UL,H}\} \\ \vdots \\ tr\{P_K^{UL} P_K^{UL,H}\} \end{bmatrix}, \quad (15)$$

where $$[\bar{T}]_{i,j} = \begin{cases} tr\left\{\sum_{l \neq i} G_i^{UL} H_l^H P_l^{UL} P_l^{UL,H} H_l G_i^{UL,H} + G_i^{UL} G_i^{UL,H}\right\} & \text{for } j = i \\ -tr\{G_j^{UL} H_i^H P_i^{UL} P_i^{UL,H} H_i^H G_j^{UL,H}\} & \text{for } j \neq i, \end{cases}$$

The solution of equation (15) can be used to obtain the transformation scaling factors $\{\tilde{\alpha}_k\}_{k=1}^{K}$, which in turn can be used to transform $(P^{UL}, G^{UL})$ to the corresponding $(P^{DL}, G^{DL})$ while preserving the mean-squared error of each user. Moreover, by summing up the rows in equation (13) and combining with equation (12), the transformation using the scaling factors $\{\tilde{\alpha}_k\}_{k=1}^{K}$ again preserves the transmit power in both uplink and downlink, as in equation (14). The iterative precoder computation method utilizes the ability to transform back and forth between the downlink and dual-uplink, thereby iteratively computing and transforming the receiver matrices to determine optimal downlink precoding weights for deployment at the coordinated base stations 110 of the CoMP system 100.

Figure 3:
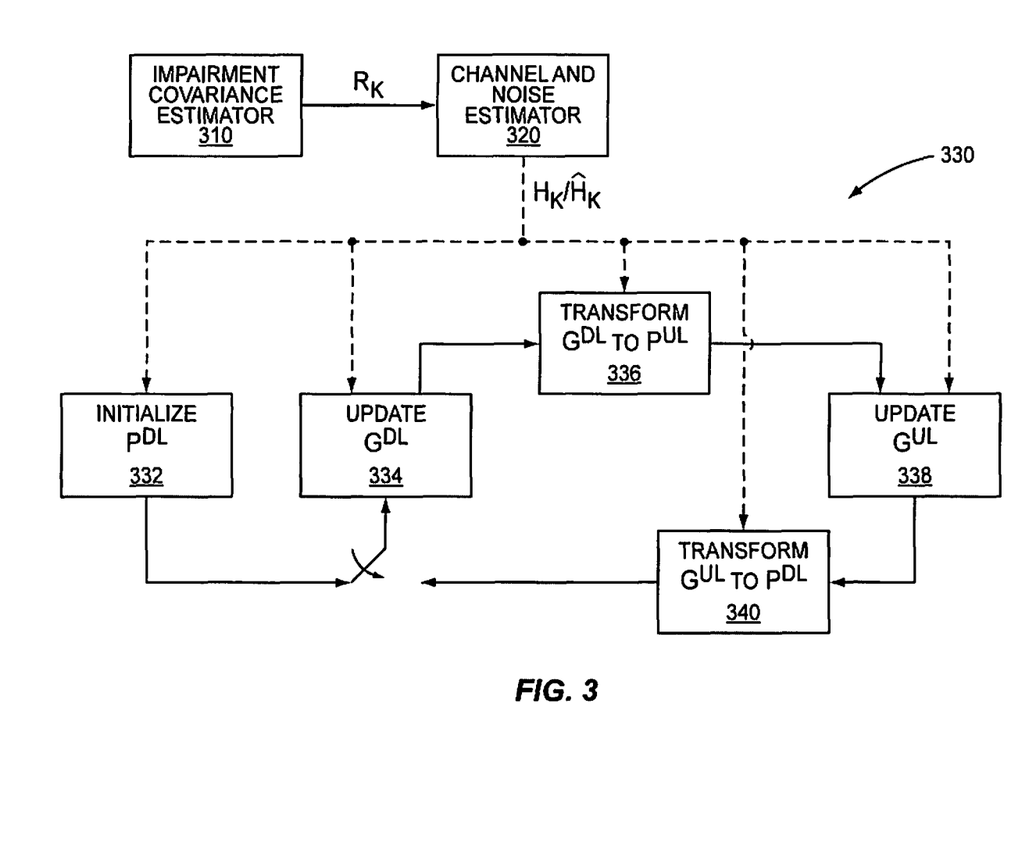
FIG. 3 illustrates a block diagram of an embodiment of a baseband processor component of the coordinated multi-point transmission system of FIGS. 1 and 2 which carries out the iterative precoding computation method.

FIG. 3 illustrates a block diagram of an embodiment of a baseband processor 300 included in each base station 110 which forms part of the CoMP cell. The baseband processor 300 includes an impairment covariance estimation module 310 for estimating impairment covariance and a channel and noise estimation module 320 for estimating channel and noise conditions. The baseband processor further includes an iterative precoder computer 330 for implementing the iterative precoder computation method described herein. A first module 332 included in or associated with the precoder computer 330 initializes the downlink precoders $P^{DL}$ for each of the base stations 110. In one embodiment, the downlink precoders $P^{DL}$ are normalized to satisfy the total power constraint $tr\{P^{DL}P^{DL,H}\} = P_{max}$. For example, $P^{DL}$ can be initialized by zero forcing the precoders given by $P^{DL} = [P_1^{DL}, P_2^{DL}, \ldots, P_k^{DL}] = H^H(HH^H)^{-1}\Lambda$, where $\Lambda$ denotes a diagonal matrix of power levels allocated to each data stream for maximizing the throughput of each individual user under the total power constraint. $\Lambda$ can be computed using standard water-filling power-allocation algorithms.

With the precoding matrices initialized for each of the k mobile stations 120, a second module 334 included in or associated with the precoder computer 330 computes the optimal downlink receiver matrices $G^{DL}$ associated with each of the k mobile stations 120 based on equation (5). Particularly, the impairment covariance estimation module 310 generates an impairment covariance estimate $R_k$ for mobile station k. The channel and noise estimation module 320 generates a channel response matrix $H_k$ based on the impairment covariance estimate $R_k$. The second precoder module 334 computes $G_k^{DL}$ for mobile station k by substituting $P_k^{DL}$ and $H_k$ into equation (5).

With the downlink precoder and receiver matrices ($P^{DL}$, $G^{DL}$), a third module 336 included in or associated with the precoder computer 330 determines the per-user transformation scaling factors $\{\bar{\alpha}_k\}_{k=1}^{K}$ by solving equation (13). These factors are then used to transform $G^{DL}$ into the precoding matrices $P^{UL}$ for the dual uplink for each of the k mobile stations 120 as given by equation (12). With $P^{UL}$, a fourth module 338 included in or associated with the precoder computer 330 computes the optimal receiver matrices $G^{UL}$ for the dual uplink using equation (10). A fifth module 340 included in or associated with the precoder computer 330 determines the per-user transformation scaling factors $\{\bar{\alpha}_k\}_{k=1}^{K}$ by solving equation (15) based on the uplink precoder and receiver matrices ($P^{UL}$, $G^{UL}$). These factors are then used to transform $G^{UL}$ back into the precoding matrices $P^{DL}$ for the base stations 110 in the downlink as given by equation (12). The process of revising $G^{DL}$ based on $P^{DL}$, transforming $G^{DL}$ to $P^{UL}$, revising $G^{UL}$ based on the new $P^{UL}$ and updating $P^{DL}$ based on the revised $G^{UL}$ is repeated a particular number of iterations to determine a final downlink precoding matrix for mobile station k and the other mobile stations 120 serviced in the COMP cell.

According to one embodiment, the number of iterations is predetermined, e.g., 10, 20, 30, etc. In another embodiment, the precoder computer 330 iterates until a difference between a mean-square error estimate computed by the baseband processor 300 for the current iteration and a mean-square error estimate computed by the baseband processor 300 for the immediately preceding iteration is below a particular threshold. When this condition occurs, further iterations are not desirable. Other stopping criteria may be used. The iterative precoder computation method converges in the sense that the weighted-sum-MSE of the resulting pair of precoding and receiver matrices ($P^{DL}$, $G^{DL}$) monotonically decreases after each iteration. The method applies to any number of receive antennas for each mobile station 120.

The iterative precoder computation method may also account for channel uncertainty. The downlink-to-uplink and uplink-to-downlink transformations previously described herein assume the channel matrix H is known perfectly at the transmitter. However, in practice, the representation of H available to the transmitter can only be an approximation. For example, in the time-division-duplex (TDD) mode of communications, the transmitter needs to estimate the channel from the uplink reference (or pilot) signals, whose limited duration (in both time and frequency) necessarily incurs an estimation error. Similarly, in the frequency-division-duplex (FDD) mode, the receiver needs to compute over the downlink reference signals an estimate of the channel, which are then quantized and fed back to the transmitter via a feedback channel. In this case, both the estimation and the quantization/feedback processes incur error in the representation of H received at the transmitter side. The iterative precoder computation method can account for channel error statistics in order to alleviate the loss due to channel uncertainty.

In more detail, the true channel $H_k$ of the kth user can be expressed as:

$$H_k = \hat{H}_k + e_k \quad (16)$$

for k=1, 2, ..., K, where $\hat{H}_k$ denotes an estimate of $H_k$ that is available to the transmitter, and $e_k$ denotes the error of the estimate, which is assumed to be statistically independent of the noise vector n (or ñ) at the receivers and the channel errors of other users $\{e_j\}_{j \neq k}$. The channel error matrix $e_k$ is assumed to have zero mean, and a covariance matrix $R_{e,k} = E[vec(e_k)$ vec$(e_k)^H$] that is known to the transmitter. For notational simplicity, let $e \equiv [e_1^H, e_2^H, \ldots, e_K^H]^H$ and $\hat{H} \equiv [\hat{H}_1^H, \hat{H}_2^H, \ldots, \hat{H}_K^H]^H$.

The baseband processor 300 can derive the error covariance matrices $\{R_{e,k}\}_{k=1}^K$ from the length and/or the autocorrelation properties of the reference signal and/or parameters of the quantizer (e.g. the number of quantization levels, etc.) used to digitize the channel estimate for feedback by mobile station k. In one embodiment, the channel estimation error is adaptive. According to this embodiment, the baseband processor 300 accounts for mobile station speed in estimating the channel estimation error. For example, channel estimation error will be higher for a rapidly moving mobile station that periodically reports channel quality information as compared to a slower-moving mobile station that periodically reports channel quality information at the same interval. Mobile station speed can be determined based on the Doppler effect observed over the reference signal in the uplink. The new channel response estimate given by equation (6) can then be used by the baseband processor 300 to revise the downlink and uplink receiver matrices $G_k^{DL}$ and $G_k^{UL}$ and/or transform the downlink receiver matrix $G_k^{DL}$ to the uplink precoder matrix $P_k^{UL}$ and transform the uplink receiver matrix $G_k^{UL}$ to the revised downlink precoding matrix $G_k^{UL}$ for mobile station k.

Broadly, substituting $H_k$ given by equation (16) into equations (1) and (2) and taking the expectation over $e_k$ in addition to $s_k$, the downlink per-user MSE with channel error can be expressed as given by:

$$mse_k^{DL}(P^{DL}, G_k^{DL}) = E_{s,e_k} \|s_k - \hat{s}_k\|^2$$

$$= E_{e_k} tr\left\{ \begin{array}{l} I - G_k^{DL} H_k P_k^{DL} - P_k^{DL,H} H_k^H G_k^{DL,H} + \\ G_k^{DL}(H_k P^{DL} P^{DL,H} H_k^H + I) G_k^{DL,H} \end{array} \right\}$$

$$= tr\left\{ \begin{array}{l} I - G_k^{DL} \hat{H}_k P_k^{DL} - P_k^{DL,H} \hat{H}_k^H G_k^{DL,H} + \\ G_k^{DL} E_{e_k} \left\{ \begin{array}{l} \hat{H}_k P^{DL} P^{DL,H} H_k^H + \\ e_k P^{DL} P^{DL,H} e_k^H + I \end{array} \right\} G_k^{DL,H} \end{array} \right\}$$

$$= \left\{ G_k^{DL} \left( \begin{array}{l} I - G_k^{DL} \hat{H}_k P_k^{DL} - P_k^{DL,H} \hat{H}_k^H G_k^{DL,H} + \\ \hat{H}_k P^{DL} P^{DL,H} \hat{H}_k^H + \\ \sum_{i,j} [P^{DL} P^{DL,H}]_{i,j} E\{[e_k]_{:,i}[e_k]_{:,j}^H\} + I \end{array} \right) G_k^{DL,H} \right\}$$

where $[A]_{i,j}$ denotes the element of the matrix A at the ith row and the jth column, $[A]_{:,j}$ denotes the jth column of the matrix A, and the term $E\{[e_k]_{:,i}[e_k]_{:,j}^H\}$ is a submatrix of $R_{e,k}$. It follows from equation (17) that the resulting MMSE receiver matrix that compensates for the channel error covariance is given by:

$$G_k^{DL} = P_k^{DL,H} \hat{H}_k^H \left[ \begin{array}{l} \hat{H}_k P^{DL} P^{DL,H} \hat{H}_k^H + \\ \sum_{i,j} [P^{DL} P^{DL,H}]_{i,j} E\{[e_k]_{:,i}[e_k]_{:,j}^H\} + I \end{array} \right]^{-1}. \quad (18)$$

Similarly in the dual uplink, the per-user MSE with channel error can be expressed as given by:

$$mse_k^{UL}(P^{UL}, G_k^{UL}) \equiv E_{s_k^{UL},e} \|s_k^{UL} - \hat{s}_k^{UL}\|^2 = \quad (19)$$

$$E_e tr\{I - G_k^{UL} H_k^H P_k^{UL} - P_k^{UL,H} H_k G_k^{UL,H} +$$

$$G_k^{UL}(H^H P^{UL} P^{UL,H} H + I) G_k^{UL,H}\} =$$

$$tr\{I - G_k^{UL} \hat{H}_k^H P_k^{UL} - P_k^{UL,H} \hat{H}_k G_k^{UL,H} +$$

$$G_k^{UL} E_e\{\hat{H}^H P^{UL} P^{UL,H} \hat{H} + e^H P^{UL} P^{UL,H} e + I\} G_k^{UL,H}\} =$$

$$tr\left\{ I - G_k^{UL} \hat{H}_k^H P_k^{UL} - P_k^{UL,H} \hat{H}_k G_k^{UL,H} + G_k^{UL} \left( \hat{H}^H P^{UL,H} \hat{H} + \right.\right.$$

$$\left.\left. \sum_{i,j} [P^{UL} P^{UL,H}]_{i,j} E\{[e]_{i,:}^H [e]_{j,:}\} + I \right) G_k^{UL,H} \right\}$$

where $[A]_{i,:}$ denotes the ith row of the matrix A and the term $E\{[e]_{i,:}^H [e]_{j,:}\}$ can be obtained from $\{R_{e,k}\}_{k=1}^K$ follows from equation (17) that the resulting MMSE receiver matrix in the dual uplink that compensates for the channel error covariance is given by:

$$G_k^{UL} = P_k^{UL,H} \hat{H}_k \left[ \begin{array}{l} \hat{H}^H P^{UL} P^{UL,H} \hat{H} + \\ \sum_{i,j} [P^{UL} P^{UL,H}]_{i,j} E\{[e]_{i,:}^H [e]_{j,:}\} + I \end{array} \right]^{-1} \quad (20)$$

The error compensated receiver matrices given in equations (18) and (20) for downlink and dual uplink, respectively, can be used to modify the iterative precoder computation method described above to determine an error-compensated precoding matrix $P^{DL}$. However, for the iterative method to operate as desired, the MSE-preserving transformation scaling factors $\{\bar{\alpha}_k\}_{k-1}^K$ and $\{\tilde{\alpha}_k\}_{k-1}^K$ should also account for the channel uncertainty. In particular, for transformation from downlink to dual uplink, equation (13) can still be used to compute the scaling factors $\{\bar{\alpha}_k\}_{k-1}^K$, except that the matrix T should now be computed as given by:

$$[\bar{T}]_{i,j} = \qquad (21)$$

$$\begin{cases} tr\left\{\sum_{l\neq i} G_i^{DL}\left(\begin{array}{c}\hat{H}_l P_l^{DL}P_l^{DL,H}\hat{H}_l^H + \\ \sum_{k,j}[P_l^{DL}P_l^{DL,H}]_{k,j}E\{[e_l]_{:,k}[e_l]_{:,j}^H\}\end{array}\right)G_i^{DL,H}\right\} + G_i^{DL}G_i^{DL,H} & \text{for } j=i \\ -tr\left\{G_j^{DL}\left(\begin{array}{c}\hat{H}_j P_i^{DL}P_i^{DL,H}\hat{H}_j^H + \\ \sum_{k,l}[P_i^{DL}P_i^{DL,H}]_{k,l}E\{[e_j]_{:,k}[e_j]_{:,l}^H\}\end{array}\right)G_j^{DL,H}\right\} & \text{for } j\neq i. \end{cases}$$

Similarly for transformation from dual-uplink to downlink, equation (15) can still be used to compute the scaling factors $\{\alpha_k\}_{k=1}^K$, except that the matrix $\tilde{T}$ should be computed as given by:

$$[\bar{T}]_{i,j} = \qquad (22)$$

$$\begin{cases} tr\left\{\sum_{l\neq i} G_i^{UL}\left(\begin{array}{c}\hat{H}_l^H P_l^{UL}P_l^{UL,H}\hat{H}_l + \\ \sum_{k,j}[P_l^{UL}P_l^{UL,H}]_{k,j}E\{[e_l]_{k,:}[e_l]_{j,:}^H\}\end{array}\right)G_i^{UL,H}\right\} + G_i^{UL}G_i^{UL,H} & \text{for } j=i \\ -tr\left\{G_j^{UL}\left(\begin{array}{c}\hat{H}_i^H P_i^{UL}P_i^{UL,H}\hat{H}_i + \\ \sum_{k,l}[P_i^{UL}P_i^{UL,H}]_{k,l}E\{[e_i]_{:,k}^H[e_i]_{l,:}^H\}\end{array}\right)G_j^{DL,H}\right\} & \text{for } j\neq i, \end{cases}$$

With the modifications given in equations (18), (20), (21) and (22), the iterative precoding computation method presented herein can be used in the same manner as in the case with perfect channel knowledge at the transmitter to generate MMSE precoders that compensate for channel uncertainty. In addition, the channel uncertainty can be accounted for when a channel error estimate computed by the baseband processor 300 exceeds a particular threshold. Below this threshold, channel estimation error is ignored when revising the downlink receiver matrix and the uplink receiver matrix. This way, channel uncertainty is accounted for only when channel the estimation error becomes problematic enough to justify the use of additional baseband signal processing resources to account for the channel uncertainty.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of determining precoder weights employed at a first base station which coordinates with other base stations to form a super-cell, the method comprising:
    (a) determining an initial downlink precoding matrix at the first base station for a mobile station serviced by the first base station in the super-cell;
    (b) revising a downlink receiver matrix associated with the mobile station based on the initial downlink precoding matrix;
    (c) transforming the revised downlink receiver matrix to an uplink precoder matrix associated with the mobile station;
    (d) revising an uplink receiver matrix associated with each base station in uplink communication with the mobile station based on the uplink precoder matrix associated with the mobile station;
    (e) revising the initial downlink precoding matrix by transforming the revised uplink receiver matrix to a revised downlink precoding matrix; and
    (f) repeating steps (b), (c), (d) and (e) until a difference between a mean-square error estimate computed for the current iteration and a mean-square error estimate computed for the immediately preceding iteration is below a particular threshold in order to determine a final downlink precoding matrix for the mobile station.

2. A method of determining precoder weights employed at a first base station which coordinates with other base stations to form a super-cell, the method comprising:
    (a) determining an initial downlink precoding matrix at the first base station for a mobile station serviced by the first base station in the super-cell;
    (b) revising a downlink receiver matrix associated with the mobile station based on the initial downlink precoding matrix;
    (c) transforming the revised downlink receiver matrix to an uplink precoder matrix associated with the mobile station;
    (d) revising an uplink receiver matrix associated with each base station in uplink communication with the mobile station based on the uplink precoder matrix associated with the mobile station;
    (e) revising the initial downlink precoding matrix by transforming the revised uplink receiver matrix to a revised downlink precoding matrix;
    (f) repeating steps (b), (c), (d) and (e) for a particular number of iterations to determine a final downlink precoding matrix for the mobile station, further comprising;
    (g) accounting for adaptive channel estimation error when revising the downlink receiver matrix and the uplink receiver matrix based on a speed of the mobile station.

3. A method of determining precoder weights employed at a first base station which coordinates with other base stations to form a super-cell, the method comprising:
    (a) determining an initial downlink precoding matrix at the first base station for a mobile station serviced by the first base station in the super-cell;

(b) revising a downlink receiver matrix associated with the mobile station based on the initial downlink precoding matrix;

(c) transforming the revised downlink receiver matrix to an uplink precoder matrix associated with the mobile station;

(d) revising an uplink receiver matrix associated with each base station in uplink communication with the mobile station based on the uplink precoder matrix associated with the mobile station;

(e) revising the initial downlink precoding matrix by transforming the revised uplink receiver matrix to a revised downlink precoding matrix;

(f) repeating steps (b), (c), (d) and (e) for a particular number of iterations to determine a final downlink precoding matrix for the mobile station, wherein the determined final downlink precoding matrix is based on determining channel estimation error based on a length or duration of a reference signal transmitted to the mobile station.

4. A method of determining precoder weights employed at a first base station which coordinates with other base stations to form a super-cell, the method comprising:

(a) determining an initial downlink precoding matrix at the first base station for a mobile station serviced by the first base station in the super-cell;

(b) revising a downlink receiver matrix associated with the mobile station based on the initial downlink precoding matrix;

(c) transforming the revised downlink receiver matrix to an uplink precoder matrix associated with the mobile station;

(d) revising an uplink receiver matrix associated with each base station in uplink communication with the mobile station based on the uplink precoder matrix associated with the mobile station;

(e) revising the initial downlink precoding matrix by transforming the revised uplink receiver matrix to a revised downlink precoding matrix;

(f) repeating steps (b), (c), (d) and (e) for a particular number of iterations to determine a final downlink precoding matrix for the mobile station, wherein the determined final downlink precoding matrix is based on determining channel estimation error based on a degree of auto-correlation of a reference signal transmitted to the mobile station.

5. A method of determining precoder weights employed at a first base station which coordinates with other base stations to form a super-cell, the method comprising:

(a) determining an initial downlink precoding matrix at the first base station for a mobile station serviced by the first base station in the super-cell;

(b) revising a downlink receiver matrix associated with the mobile station based on the initial downlink precoding matrix;

(c) transforming the revised downlink receiver matrix to an uplink precoder matrix associated with the mobile station;

(d) revising an uplink receiver matrix associated with each base station in uplink communication with the mobile station based on the uplink precoder matrix associated with the mobile station;

(e) revising the initial downlink precoding matrix by transforming the revised uplink receiver matrix to a revised downlink precoding matrix;

(f) repeating steps (b), (c), (d) and (e) for a particular number of iterations to determine a final downlink precoding matrix for the mobile station, wherein the determined final downlink precoding matrix is based on determining channel estimation error based on one or more parameters associated with a quantizer of the mobile station used to digitize a channel estimate for feedback.

6. A method of determining precoder weights employed at a first base station which coordinates with other base stations to form a super-cell, the method comprising:

(a) determining an initial downlink precoding matrix at the first base station for a mobile station serviced by the first base station in the super-cell;

(b) revising a downlink receiver matrix associated with the mobile station based on the initial downlink precoding matrix;

(c) transforming the revised downlink receiver matrix to an uplink precoder matrix associated with the mobile station;

(d) revising an uplink receiver matrix associated with each base station in uplink communication with the mobile station based on the uplink precoder matrix associated with the mobile station;

(e) revising the initial downlink precoding matrix by transforming the revised uplink receiver matrix to a revised downlink precoding matrix;

(f) repeating steps (b), (c), (d) and (e) for a particular number of iterations to determine a final downlink precoding matrix for the mobile station, further comprising;

(g) accounting for the channel estimation error when a channel error estimate computed by the first base station exceeds a particular threshold, and otherwise ignoring the channel estimation error when revising the downlink receiver matrix and the uplink receiver matrix.

7. A method of determining precoder weights employed at a first base station which coordinates with other base stations to form a super-cell, the method comprising:

(a) determining an initial downlink precoding matrix at the first base station for a mobile station serviced by the first base station in the super-cell;

(b) revising a downlink receiver matrix associated with the mobile station based on the initial downlink precoding matrix;

(c) transforming the revised downlink receiver matrix to an uplink precoder matrix associated with the mobile station;

(d) revising an uplink receiver matrix associated with each base station in uplink communication with the mobile station based on the uplink precoder matrix associated with the mobile station;

(e) revising the initial downlink precoding matrix by transforming the revised uplink receiver matrix to a revised downlink precoding matrix;

(f) repeating steps (b), (c), (d) and (e) for a particular number of iterations to determine a final downlink precoding matrix for the mobile station, further comprising:

(g) accounting for the channel estimation error when computing scaling factors used to transform the revised downlink receiver matrix to the uplink precoder matrix.

8. A base station in coordination with other base stations to form a super-cell, comprising a baseband processor operable to:

(a) determine an initial downlink precoding matrix for a mobile station serviced by the base station in the super-cell;

(b) revise a downlink receiver matrix associated with the mobile station based on the initial downlink precoding matrix;

(c) transform the revised downlink receiver matrix to an uplink precoder matrix associated with the mobile station;

(d) revise an uplink receiver matrix associated with each base station in uplink communication with the mobile station based on the uplink precoder matrix associated with the mobile station;

(e) revise the initial downlink precoding matrix by transforming the revised uplink receiver matrix to a revised downlink precoding matrix; and (f) repeat operations (b), (c), (d) and (e) for a particular number of iterations to determine a final downlink precoding matrix for the mobile station, wherein the baseband processor is operable to compute a mean-square error estimate for a current iteration and for an immediately preceding iteration and repeat steps (b), (c), (d) and (e) until a difference between the mean-square error estimates is below a particular threshold.

9. A base station in coordination with other base stations to form a super-cell, comprising a baseband processor operable to:

(a) determine an initial downlink precoding matrix for a mobile station serviced by the base station in the super-cell;

(b) revise a downlink receiver matrix associated with the mobile station based on the initial downlink precoding matrix;

(c) transform the revised downlink receiver matrix to an uplink precoder matrix associated with the mobile station;

(d) revise an uplink receiver matrix associated with each base station in uplink communication with the mobile station based on the uplink precoder matrix associated with the mobile station;

(e) revise the initial downlink precoding matrix by transforming the revised uplink receiver matrix to a revised downlink precoding matrix; and (f) repeat operations (b), (c), (d) and (e) for a particular number of iterations to determine a final downlink precoding matrix for the mobile station, wherein the baseband processor is operable to account for an adaptive channel estimation error which is based on a speed of the mobile station when revising the downlink receiver matrix and the uplink receiver matrix.

10. A base station in coordination with other base stations to form a super-cell, comprising a baseband processor operable to:

(a) determine an initial downlink precoding matrix for a mobile station serviced by the base station in the super-cell;

(b) revise a downlink receiver matrix associated with the mobile station based on the initial downlink precoding matrix;

(c) transform the revised downlink receiver matrix to an uplink precoder matrix associated with the mobile station;

(d) revise an uplink receiver matrix associated with each base station in uplink communication with the mobile station based on the uplink precoder matrix associated with the mobile station;

(e) revise the initial downlink precoding matrix by transforming the revised uplink receiver matrix to a revised downlink precoding matrix; and (f) repeat operations (b), (c), (d) and (e) for a particular number of iterations to determine a final downlink precoding matrix for the mobile station, wherein the baseband processor is operable to determine channel estimation error based on a length or duration of a reference signal transmitted to the mobile station and determine the final downlink precoding matrix based on the determined channel estimation error.

11. A base station in coordination with other base stations to form a super-cell, comprising a baseband processor operable to:

(a) determine an initial downlink precoding matrix for a mobile station serviced by the base station in the super-cell;

(b) revise a downlink receiver matrix associated with the mobile station based on the initial downlink precoding matrix;

(c) transform the revised downlink receiver matrix to an uplink precoder matrix associated with the mobile station;

(d) revise an uplink receiver matrix associated with each base station in uplink communication with the mobile station based on the uplink precoder matrix associated with the mobile station;

(e) revise the initial downlink precoding matrix by transforming the revised uplink receiver matrix to a revised downlink precoding matrix; and (f) repeat operations (b), (c), (d) and (e) for a particular number of iterations to determine a final downlink precoding matrix for the mobile station, wherein the baseband processor is operable to determine channel estimation error based on a degree of auto-correlation of a reference signal transmitted to the mobile station and the determined final downlink precoding matrix is based on the determined channel estimation error.

12. A base station in coordination with other base stations to form a super-cell, comprising a baseband processor operable to:

(a) determine an initial downlink precoding matrix for a mobile station serviced by the base station in the super-cell;

(b) revise a downlink receiver matrix associated with the mobile station based on the initial downlink precoding matrix;

(c) transform the revised downlink receiver matrix to an uplink precoder matrix associated with the mobile station;

(d) revise an uplink receiver matrix associated with each base station in uplink communication with the mobile station based on the uplink precoder matrix associated with the mobile station;

(e) revise the initial downlink precoding matrix by transforming the revised uplink receiver matrix to a revised downlink precoding matrix; and (f) repeat operations (b), (c), (d) and (e) for a particular number of iterations to determine a final downlink precoding matrix for the mobile station, wherein the baseband processor is operable to determine channel estimation error based on one or more parameters associated with a quantizer of the mobile station used to digitize a channel estimate for feedback and determine the final downlink precoding matrix based on the determined channel estimation error.

13. A base station in coordination with other base stations to form a super-cell, comprising a baseband processor operable to:

(a) determine an initial downlink precoding matrix for a mobile station serviced by the base station in the super-cell;

(b) revise a downlink receiver matrix associated with the mobile station based on the initial downlink precoding matrix;

(c) transform the revised downlink receiver matrix to an uplink precoder matrix associated with the mobile station;

(d) revise an uplink receiver matrix associated with each base station in uplink communication with the mobile station based on the uplink precoder matrix associated with the mobile station;
(e) revise the initial downlink precoding matrix by transforming the revised uplink receiver matrix to a revised downlink precoding matrix; and
(f) repeat operations (b), (c), (d) and (e) for a particular number of iterations to determine a final downlink precoding matrix for the mobile station, wherein the baseband processor is operable to account for channel estimation error when a channel error estimate computed by the base station exceeds a particular threshold, and otherwise ignore the channel estimation error when revising the downlink receiver matrix and the uplink receiver matrix.

14. A base station in coordination with other base stations to form a super-cell, comprising a baseband processor operable to:
(a) determine an initial downlink precoding matrix for a mobile station serviced by the base station in the super-cell;
(b) revise a downlink receiver matrix associated with the mobile station based on the initial downlink precoding matrix;
(c) transform the revised downlink receiver matrix to an uplink precoder matrix associated with the mobile station;
(d) revise an uplink receiver matrix associated with each base station in uplink communication with the mobile station based on the uplink precoder matrix associated with the mobile station;
(e) revise the initial downlink precoding matrix by transforming the revised uplink receiver matrix to a revised downlink precoding matrix; and
(f) repeat operations (b), (c), (d) and (e) for a particular number of iterations to determine a final downlink precoding matrix for the mobile station, wherein the baseband processor is further operable to account for channel estimation error when computing scaling factors used to transform the revised downlink receiver matrix to the uplink precoder matrix.

* * * * *

UNITED STATES PATENT AND TRADEMARK OFFICE
CERTIFICATE OF CORRECTION

PATENT NO. : 8,675,718 B2  
APPLICATION NO. : 12/571494  
DATED : March 18, 2014  
INVENTOR(S) : Hui et al.

Page 1 of 4

It is certified that error appears in the above-identified patent and that said Letters Patent is hereby corrected as shown below:

On the title page, item (56), under "OTHER PUBLICATIONS", in Column 2, Line 8, delete "val. 13," and insert -- vol. 13, --, therefor.

On the title page, item (56), under "OTHER PUBLICATIONS", in Column 2, Line 13, delete "val. 53," and insert -- vol. 53, --, therefor.

In the Specification

In Column 1, Line 64, delete "preceding" and insert -- precoding --, therefor.

In Column 2, Line 8, delete "preceding" and insert -- precoding --, therefor.

In Column 3, Line 50, in Equation (2), delete "$= G_k R_k^{-1/2} \left[ \bar{H}_k \left( \sum_{j=1}^{K} P_j s_j \right) + \tilde{n}_k \right]$" and insert -- $= G_k R_k^{-1/2} \left[ \tilde{H}_k \left( \sum_{j=1}^{K} P_j s_j \right) + \tilde{n}_k \right]$ --, therefor.

In Column 4, Line 5, delete "$H_k = R_k^{-1/2} \tilde{H}_k$" and insert -- $H_k = R_k^{-1/2} \tilde{H}_k$ --, therefor.

In Column 4, Lines 66-67, in Equation (6), delete "$= \underset{P:tr(PP^H) \leq P_{max}}{argmax} \sum_{k=1}^{K} w_k tr \left[ P_k^H H_k^H [H_k PP^H H_k^H + I]^{-1} H_k P_k \right]$" and insert -- $= \underset{P:tr(PP^H) \leq P_{max}}{argmax} \sum_{k=1}^{K} w_k tr \left[ P_k^H H_k^H [H_k PP^H H_k^H + I]^{-1} H_k P_k \right]$ --, therefor.

Signed and Sealed this  
Fifth Day of August, 2014

Michelle K. Lee  
*Deputy Director of the United States Patent and Trademark Office*

CERTIFICATE OF CORRECTION (continued)
U.S. Pat. No. 8,675,718 B2

In Column 5, Line 24, delete "$n_t*n_h$" and insert -- $n_t*n_b$ --, therefor.

In Column 5, Lines 62-63, in Equation (9), delete "$mse_k^{UL}(P^{UL}, G_k^{UL}) = tr\{I - G_k^{UL} H_k^H P_k^{UL} - P_k^{UL,H} H_k^H G_k^{UL,H} + G_k^{UL}(H^H P^{UL} P^{UL,H} H + I) G_k^{UL,H}\}$"

and insert -- $mse_k^{UL}(P^{UL}, G_k^{UL}) = tr\{I - G_k^{UL} H_k^H P_k^{UL} - P_k^{UL,H} H_k G_k^{UL,H} + G_k^{UL}(H^H P^{UL} P^{UL,H} H + I) G_k^{UL,H}\}$ --, therefor.

In Column 6, Lines 44-47, in Equation, delete "$[T]_{i,j} = \begin{cases} tr\{\sum_{l \neq i} G_l^{DL} H_l P_l^{DL,H} H_l^H G_l^{DL,H} + G_l^{DL} G_l^{DL,H}\} & \text{for } j=i \\ -tr\{G_j^{DL} H_j P_i^{DL} P_j^{DL,H} H_i^H G_j^{DL,H}\} & \text{for } j \neq i \end{cases}$" and insert -- $[T]_{i,j} = \begin{cases} tr\{\sum_{l \neq i} G_l^{DL} H_l P_l^{DL} P_l^{DL,H} H_l^H G_l^{DL,H} + G_l^{DL} G_l^{DL,H}\} & \text{for } j=i \\ -tr\{G_j^{DL} H_j P_i^{DL} P_i^{DL,H} H_j^H G_j^{DL,H}\} & \text{for } j \neq i \end{cases}$ --, therefor.

In Column 7, Lines 7-12, in Equation (15), delete "$T \begin{bmatrix} \sigma_1^2 \\ \sigma_2^2 \\ \vdots \\ \sigma_k^2 \end{bmatrix} =$" and insert -- $\bar{T} \begin{bmatrix} \bar{\alpha}_1^2 \\ \bar{\alpha}_2^2 \\ \vdots \\ \bar{\alpha}_k^2 \end{bmatrix} =$ --, therefor.

In Column 7, Lines 16-18, in Equation, delete "$[\bar{T}]_{i,j} = \begin{cases} tr\{\sum_{l \neq i}' G_l^{UL} H_l^H P_l^{UL} P_l^{UL,H} H_l G_l^{UL,H} + G_l^{UL} G_l^{UL,H}\} & \text{for } j=i \\ -tr\{G_j^{UL} H_j^H P_i^{UL} P_i^{UL,H} H_i^H G_j^{UL,H}\} & \text{for } j \neq i, \end{cases}$"

and insert -- $[\bar{T}]_{i,j} = \begin{cases} tr\{\sum_{l \neq i} G_l^{UL} H_l^H P_l^{UL} P_l^{UL,H} H_l G_l^{UL,H} + G_l^{UL} G_l^{UL,H}\} & \text{for } j=i \\ -tr\{G_j^{UL} H_j^H P_i^{UL} P_i^{UL,H} H_j G_j^{UL,H}\} & \text{for } j \neq i, \end{cases}$ --, therefor.

In Column 7, Line 23, delete "$(P^{UL}G^{UL})$" and insert -- $(P^{UL}, G^{UL})$ --, therefor.

In Column 8, Line 12, delete "$\{\overline{\alpha}_k\}_{k=1}^K$" and insert -- $\{\bar{\alpha}_k\}_{k=1}^K$ --, therefor.

In Column 8, Line 22, delete "COMP" and insert -- CoMP --, therefor.

In Column 9, Lines 33-45, in Equation (17), delete "$mse_k^{DL}(P^{DL}, G_k^{DL}) = E_{k,e_k} \|s_k - \hat{s}_k\|^2$
$= E_{e_k} tr\{I - G_k^{DL} H_k P_k^{DL} P_k^{DL,H} H_k^H G_k^{DL,H} + G_k^{DL}(H_k P^{DL} P^{DL,H} H_k^H + I) G_k^{DL,H}\}$
$= tr\{I - G_k^{DL} H_k P_k^{DL} - P_k^{DL,H} H_k^H G_k^{DL,H} + G_k^{DL} E_{e_k}\{H_k P^{DL} P^{DL,H} H_k^H + e_k P^{DL} P^{DL,H} e_k^H + I\} G_k^{DL,H}\}$
$= \{I - G_k^{DL} H_k P_k^{DL} - P_k^{DL,H} H_k^H G_k^{DL,H} + G_k^{DL}(H_k P^{DL} P^{DL,H} H_k^H + \sum_{i,j}[P^{DL} P^{DL,H}]_{i,j} E\{[e_k]_{\cdot,j}[e_k]_{\cdot,j}^H\} + I) G_k^{DL,H}\}$"

CERTIFICATE OF CORRECTION (continued)
U.S. Pat. No. 8,675,718 B2 and insert --
$$\begin{aligned}\max_{c_k^{DL}}(P_k^{DL}, G_k^{DL}) &= E_{e_k}|e_k - \hat{e}_k|^2 \\ &= E_{e_k}tr\{1 - G_k^{DL}H_kP_k^{DL} - P_k^{DL,H}H_k^HG_k^{DL,H} + G_k^{DL}(H_kP^{DL}P^{DL,H}H_k^H + I)G_k^{DL,H}\} \\ &= tr\{1 - G_k^{DL}\hat{H}_kP_k^{DL} - P_k^{DL,H}\hat{H}_k^HG_k^{DL,H} + G_k^{DL}E_{e_k}\{\hat{H}_kP^{DL}P^{DL,H}\hat{H}_k^H + e_kP^{DL}P^{DL,H}e_k^H + I\}G_k^{DL,H}\} \\ &= tr\begin{bmatrix}1 - G_k^{DL}\hat{H}_kP_k^{DL} - P_k^{DL,H}\hat{H}_k^HG_k^{DL,H} \\ + G_k^{DL}\left(\hat{H}_kP^{DL}P^{DL,H}\hat{H}_k^H + \sum_{i,j}[P^{DL}P^{DL,H}]_{i,j}E\{[e_k]_{:,i}[e_k^H]_{:,j}\} + I\right)G_k^{DL,H}\end{bmatrix}\end{aligned}$$
--, therefor.

In Column 9, Line 51, delete "$[A]_{i,j}$" and insert -- $[A]_{:,j}$ --, therefor.

In Column 9, Lines 63-65, in Equation (18), delete
$$G_k^{DL} = P_k^{DL,H}\hat{H}_k^H\left[\hat{H}_kP^{DL}P^{DL,H}\hat{H}_k^H + \sum_{i,j}[P^{DL}P^{DL,H}]_{i,j}E\{[e_k]_{:,i}[e_k]_{:,j}^H\} + I\right]^{-1}$$
" and insert
$$G_k^{DL} = P_k^{DL,H}\hat{H}_k^H\left[\hat{H}_kP^{DL}P^{DL,H}\hat{H}_k^H + \sum_{i,j}[P^{DL}P^{DL,H}]_{i,j}E\{[e_k]_{:,i}[e_k]_{:,j}^H\} + I\right]^{-1}$$
--, therefor.

In Column 10, Lines 17-23, in Equation (19), delete "
$$tr\left\{I - G_k^{UL}\hat{H}_k^HP_k^{UL} - P_k^{UL,H}\hat{H}_kG_k^{UL,H} + G_k^{UL}\left(\hat{H}^HP^{UL,H}\hat{H} + \sum_{i,j}[P^{UL}P^{UL,H}]_{i,j}E\{[e]_{:,i}^H[e]_{:,j}\} + I\right)G_k^{UL,H}\right\}$$
"
and insert --
$$= tr\left\{1 - G_k^{UL}\hat{H}_k^HP_k^{UL} - P_k^{UL,H}\hat{H}_kG_k^{UL,H} + G_k^{UL}\left(\hat{H}^HP^{UL}P^{UL,H}\hat{H} + \sum_{i,j}[P^{UL}P^{UL,H}]_{i,j}E\{[e]_{:,i}^H[e]_{:,j}\} + I\right)G_k^{UL,H}\right\}$$
--, therefor.

In Column 10, Line 25, delete "$\{R_{e,k}\}_{k=1}^K$" and insert -- $\{\mathbf{R}_{e,k}\}_{k=1}^K$. It --, therefor.

In Column 10, Line 63, delete "$\{\overline{\alpha}_k\}_{k-1}^K$ and $\{\tilde{\alpha}_k\}_{k-1}^K$" and insert -- $\{\overline{\alpha}_k\}_{k=1}^K$ and $\{\tilde{\alpha}_k\}_{k=1}^K$ --, therefor.

In Column 10, Line 66, delete "$\{\overline{\alpha}_k\}_{k-1}^K$," and insert -- $\{\overline{\alpha}_k\}_{k=1}^K$, --, therefor.

In Column 11, Lines 1-10, in Equation (21), delete $[\tilde{T}]_{i,j} =$

"
$$\begin{cases} tr\left\{\sum_{l\neq i} G_i^{DL}\left(\begin{array}{c}H_l P_l^{DL} P_l^{DL,H} H_l^H + \\ \sum_{k,j}[P_l^{DL}P_l^{DL,H}]_{k,j}E\{[e_l]_{:,k}[e_l]_{:,j}^H\}\end{array}\right)G_i^{DL,H}\right\} + G_i^{DL}G_i^{DL,H} & \text{for } j = i \\ -tr\left\{G_j^{DL}\left(\begin{array}{c}\hat{H}_j P_j^{DL} P_j^{DL,H} \hat{H}_j^H + \\ \sum_{k,l}[P_j^{DL}P_j^{DL,H}]_{k,l}E\{[e_j]_{:,k}[e_j]_{:,l}^H\}\end{array}\right)G_i^{DL,H}\right\} & \text{for } j \neq i. \end{cases}$$
" and insert $$[\tilde{T}]_{i,j} = \begin{cases} tr\left\{\sum_{l\neq i} G_i^{DL}\left(\hat{H}_l P_l^{DL} P_l^{DL,H}\hat{H}_l^H + \sum_{k,j}[P_l^{DL}P_l^{DL,H}]_{k,j}E\{[e_l]_{:,k}[e_l]_{:,j}^H\}\right)G_i^{DL,H}\right\} + G_i^{DL}G_i^{DL,H} & \text{for } j = i \\ -tr\left\{G_j^{DL}\left(\hat{H}_j P_j^{DL} P_j^{DL,H}\hat{H}_j^H + \sum_{k,l}[P_j^{DL}P_j^{DL,H}]_{k,l}E\{[e_j]_{:,k}[e_j]_{:,l}^H\}\right)G_i^{DL,H}\right\} & \text{for } j \neq i. \end{cases}$$
--, therefor.

In Column 11, Lines 22-27, in Equation (22), delete

"
$$\begin{cases} tr\left\{\sum_{l\neq i} G_i^{UL}\left(\begin{array}{c}\hat{H}_l^H P_l^{UL}P_l^{UL,H}\hat{H}_l + \\ \sum_{k,j}[P_l^{UL}P_l^{UL,H}]_{k,j}E\{[e_l]_{k,:}[e_l]_{j,:}^H\}\end{array}\right)G_i^{UL,H}\right\} + G_i^{UL}G_i^{UL,H} & \text{for } j = i \\ -tr\left\{G_j^{UL}\left(\begin{array}{c}\hat{H}_l^H P_l^{UL}P_l^{UL,H}\hat{H}_l + \\ \sum_{k,l}[P_l^{UL}P_l^{UL,H}]_{k,l}E\{[e_l]_{:,k}^H[e_l]_{l,:}^H\}\end{array}\right)G_j^{DL,H}\right\} & \text{for } j \neq i, \end{cases}$$
" and insert $$\begin{cases} tr\left\{\sum_{l\neq i} G_i^{UL}\left(\hat{H}_l^H P_l^{UL}P_l^{UL,H}\hat{H}_l + \sum_{k,j}[P_l^{UL}P_l^{UL,H}]_{k,j}E\{[e_l]_{k,:}^H[e_l]_{j,:}\}\right)G_i^{UL,H}\right\} + G_i^{UL}G_i^{UL,H} & \text{for } j \neq i \\ -tr\left\{G_j^{UL}\left(\hat{H}_l^H P_l^{UL}P_l^{UL,H}\hat{H}_l + \sum_{k,l}[P_l^{UL}P_l^{UL,H}]_{k,l}E\{[e_l]_{:,k}^H[e_l]_{l,:}\}\right)G_j^{UL,H}\right\} & \text{for } j \neq i, \end{cases}$$
--, therefor.